United States Patent [19]

Litvin et al.

[11] 4,449,741
[45] May 22, 1984

[54] WASTE PLUMBING INSTALLATION AND FITTINGS THEREFOR

[76] Inventors: Robert L. Litvin, 180 E. Pearson St., Chicago, Ill. 60611; David W. Price, 8749 S. Kenneth Ave., Hometown, Ill. 60456

[21] Appl. No.: 249,627

[22] Filed: Mar. 31, 1981

[51] Int. Cl.³ .............................................. F16L 41/00
[52] U.S. Cl. .......................................... 285/153; 4/211
[58] Field of Search ................... 285/150, 153; 4/211, 4/DIG. 7, 252 R

[56] References Cited

U.S. PATENT DOCUMENTS

| 1,081,633 | 12/1913 | Smith | 4/211 X |
| 1,086,938 | 2/1914 | Rock | 285/150 X |
| 1,197,395 | 9/1916 | Politsky | 285/153 |
| 1,640,058 | 8/1927 | Stringer | 285/150 X |
| 1,718,450 | 6/1929 | Backus | 285/153 |
| 1,868,355 | 7/1932 | Goldberg | 285/150 X |
| 2,652,069 | 9/1953 | Goheen | 285/150 X |
| 3,495,281 | 2/1970 | Palowsky | 285/153 X |
| 3,711,128 | 1/1973 | Hezel et al. | 285/153 |

Primary Examiner—Thomas F. Callaghan
Attorney, Agent, or Firm—Norman Lettvin

[57] ABSTRACT

A plumbing network section for multi-storied construction is disclosed which uses an integral waste stack segment and waste receiving manifold for receiving waste from plumbing fixtures, and with multiple vents in the waste receiving manifold arranged for connection to a vent manifold. The combination waste stack section and waste manifold, and also the vent manifold uses sleeve type construction for connection to pipes which simplifies assembly in the field and effects reduction in labor and parts costs.

1 Claim, 8 Drawing Figures

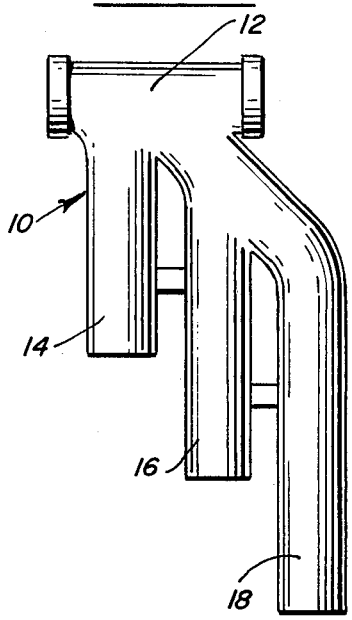
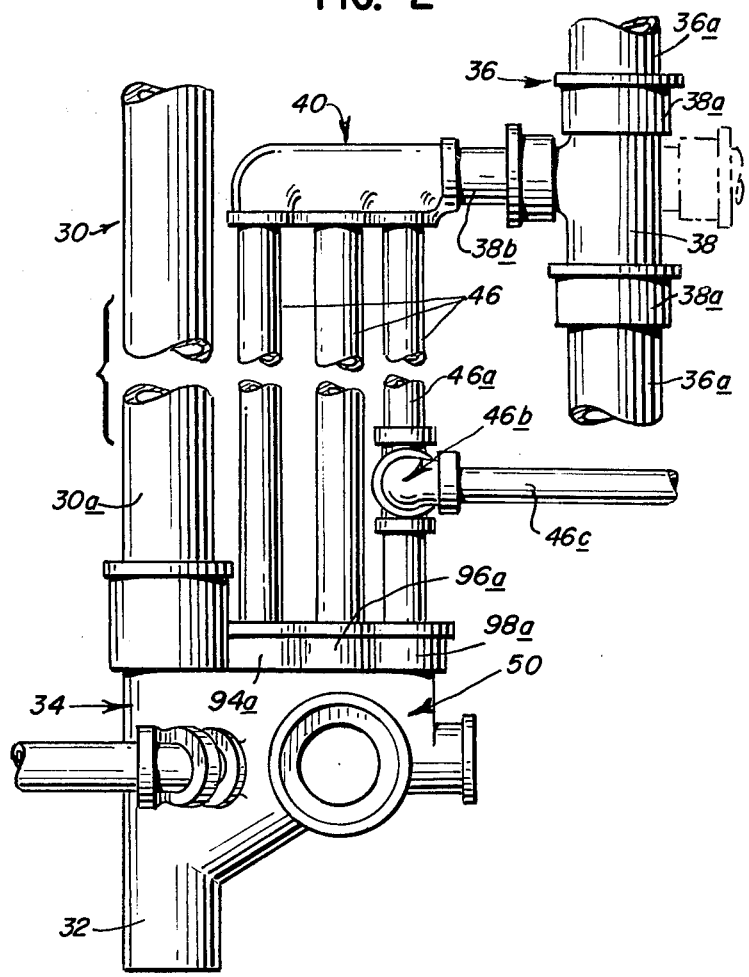
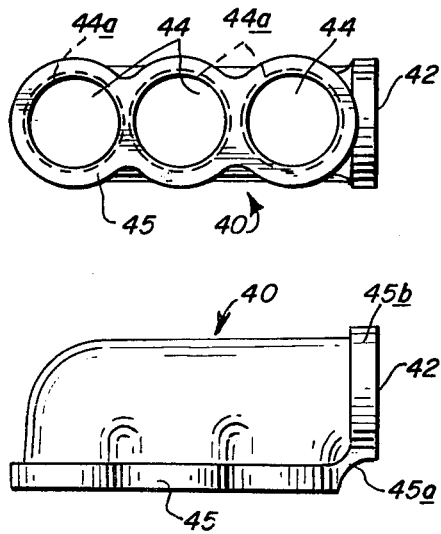
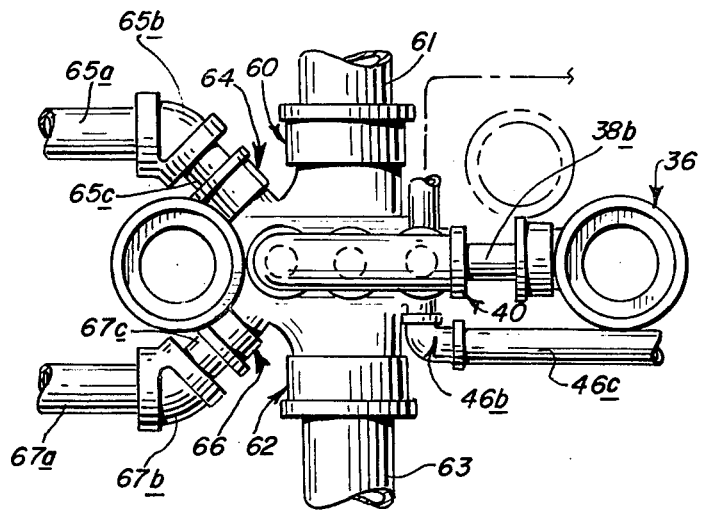
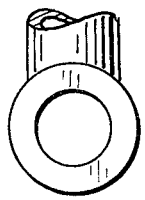

WASTE PLUMBING INSTALLATION AND FITTINGS THEREFOR

FIELD OF THE INVENTION

This invention relates to a plumbing installation and more particularly to improved collecting and venting manifold fittings for handling plumbing waste.

BACKGROUND OF THE INVENTION

The collection and disposal of plumbing waste, and required venting associated with such waste collection is well established in the building construction art.

In high rise, multi-storied, dwelling structures it is established practice to substantially duplicate floor plumbing layouts in each story of the structure. The waste pipes from various plumbing appliances such as toilet, bathroom or lavatory, bathtub, kitchen sink, and the like, are than arranged to discharge or empty into a common waste stack, in the form of a large diameter pipe, which runs the entire height of the structure leading to ultimate disposal means at the bottom of the waste stack. Venting is required to be effected in connection with accumulating and discharging the plumbing waste, and again it is common practice to tie or pipe the vents into a common vent stack which runs the entire height of the structure, leading to a vent opening at the top of the vent stack.

In certain communities, construction codes provide specific requirements dealing with handling of waste or venting or both. Thus, in Chicago for example, the construction code requires three separate vent, or stack openings to meet requirement of separate vents for three major plumbing fixtures, toilets, tubs and lavatories.

In the installation of the plumbing network in a high rise apartment building or the like, if each plumbing fixture has to be individually tied or piped into a standard waste stack or vent stack, much individual fitting is required, greatly increasing the total plumbing labor cost for an installation.

At the same time, there frequently exist variations in piping layouts, either because of selective variant arrangements of plumbing fixtures within a bathroom or because of some other difficulty that might arise in connection with field installation. The latter problems substantially eliminate the ability to completely pre-cut, or sub-assemble piping configurations, so that substantial field work is always required. As an example, in connecting sections of the stacks between floors, it is typical that the upper end of one stack fitting section has to be connected with the lower end of the stack fitting section of the floor above. If there is required different makeup lengths between each two fittings to be connected, one cannot pre-cut the stack sections in the precise amount and previous practice where such problems arise have required the use of a "Sissom" joint which is expensive.

Thus, one object of this invention is to provide fittings which substantially avoid the aforesaid problems, and the usage of which substantially reduces overall total cost of labor required to effect plumbing stack connections in the field.

Another object is to provide improved waste-collecting, and venting manifolds for use in effecting the necessary plumbing fixture connections to waste stacks and to vent stacks.

A further object of this invention is to provide plumbing manifold constructions which promote economy and efficiency of connection to pipe sections that normally feed into a waste stack.

Further objects and advantages of this invention will become apparent to one skilled in the art as the description of the invention herein proceeds.

DESCRIPTION OF PRIOR ART

As will be described herein, it has heretofore been known to provide a venting manifold consisting of a plurality of parallel vent pipes each of different length joined to a single tubular section that is open and threaded at both ends to receive and connect to other vent pipe sections. The vent pipes of such a manifold were required to be of different length to accommodate their respective connection to other vent pipes.

SUMMARY OF THE INVENTION

In the instant invention a single casting provides a segment of a waste stack integral with a laterally elongated waste manifold which has multiple sleeve-type fitting extensions that project from the manifold in such a manner as to provide for common multiple terminal variations, for normally effecting connections of plumbing fixtures to the waste stack. The single casting thus serves as a common form to which multiple waste connections may be made. By indicating which sleeve type extensions are to be functional and used at a particular station, and by setting up the casting mold to provide that only those sleeves that will be used are to connect to a functioning opening to the manifold, the same mold may be used to produce variant layouts or constructions of the combination waste stack and waste manifold.

The waste manifold is itself provided with the maximum required vent openings, each surrounded by a sleeve connector. All sleeve connectors on the manifold and waste stack are for cooperation with pipe sections that telescope into the sleeves.

A vent manifold of simple elbow shape is provided for cooperation with the vent openings in the waste-receiving manifold, and sleeve connectors are employed on the vent manifold of the same type as used on the waste manifold. This construction avoids the use of vent pipe sections of different length as used in the prior art, and provides means adapted for simple assembly in the field and leading to less expensive construction.

The invention will be more fully understood from the following description of a preferred embodiment shown in the drawings.

BRIEF DESCRIPTION OF THE DRAWINGS

FIG. 1 illustrates in a side elevational view the prior art vent manifold referred to herein;

FIG. 2 is an elevational view, with portions broken away, illustrating a plumbing layout that includes the inventions disclosed herein, including an integral waste stack section and waste receiving manifold with multiple vent openings therein, and showing connection from the manifold's vent openings through vent pipes that connect to an elbow-type vent manifold which itself is connected to a vent stack;

FIG. 3 is a top elevational view of a plumbing arrangement utilizing the two manifolds shown in FIG. 2;

FIG. 4 is a bottom plan view of the elbow-type vent manifold seen in FIGS. 2 and 3;

FIG. 5 is a side elevational view of the vent manifold shown in FIG. 4.

DESCRIPTION OF THE PREFERRED EMBODIMENT

Figure 6:
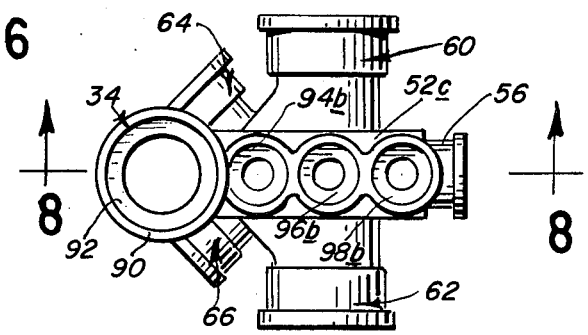
FIG. 6 is a top plan view of the integral waste stack segment and waste receiving manifold fitting shown in FIGS. 2 and 3.

Referring now to the drawings, a prior art venting manifold is generally indicated at 10 and consists of a horizontal length of through pipe 12 open and threaded at both ends thereof and having depending therefrom three vertical vent pipes 14, 16 and 18 of different lengths, with the two vertical vent pipes 16 and 18 having a common section 20 which communicates to horizontal pipe section 12.

In the improved construction shown in FIG. 2, the normal environment includes both a waste stack and a vent stack, each of which runs substantially the entire height of the building in which are a plurality of stories. Each of the stories requires a waste fitting that is normally installed just at, or usually below, the floor of one story, and an associated vent fitting for said waste fitting is normally installed at about the floor of the story above said one story.

Thus, FIG. 2 illustrates a waste stack means, generally 30, that will include multiple lengths of pipe 30a that alternate with a waste stack segment 32 that is part of a waste fitting, generally 34. The vent stack means, generally 36, will include multiple lengths of pipe 36a that alternate with T-fittings 38 whose opposed arms each connect through a connection sleeve 38a with the end of a pipe length 36a. The stem of T-fitting 38 extends horizontally and provides a connector pipe length 38b which is adapted to connect to the screw threaded end of a vent manifold, generally 40.

More specifically, the details of the vent manifold 40 are shown in FIGS. 4 and 5. The manifold 40 is an elbow-shaped cast body with only a single female threaded outlet 42 provided at one end of the elbow. In the other face of the elbow there are provided three adjacent, female threaded inlets 44 whose axes are perpendicular to the axis of outlet 42. The axial length of the three inlets 44 are equal, and each inlet 44 is female threaded at 44a to be adapted to receive therein the threaded terminus of a vent pipe means 46. As clearly seen in FIGS. 4 and 5, the termini of the three inlets 44 are located in a single plane and the female threaded portions are made thicker to provide reinforcement that merges into a continuous rim structure 45 that is planar at the face of the manifold 40 seen in FIG. 4. The reinforcing rim structure 45 is also continued around the inner elbow fold at 45a to merge with reinforcing rim 45b provided surrounding the outlet 42.

Merely for purposes of illustration, as a possible alternative, the one vent pipe means 46a to the right in FIG. 2 is shown to have an elbow connection 46b intermediate the length of pipe 46a to which a branch vent pipe 46c may connect.

Figure 7:
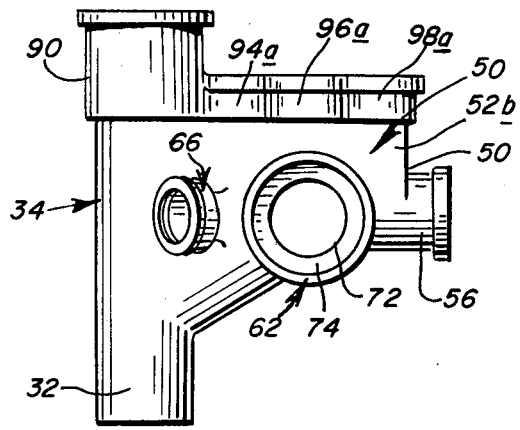
FIG. 7 is a side elevational view of the stack and manifold fitting shown in FIG. 6.
Figure 8:
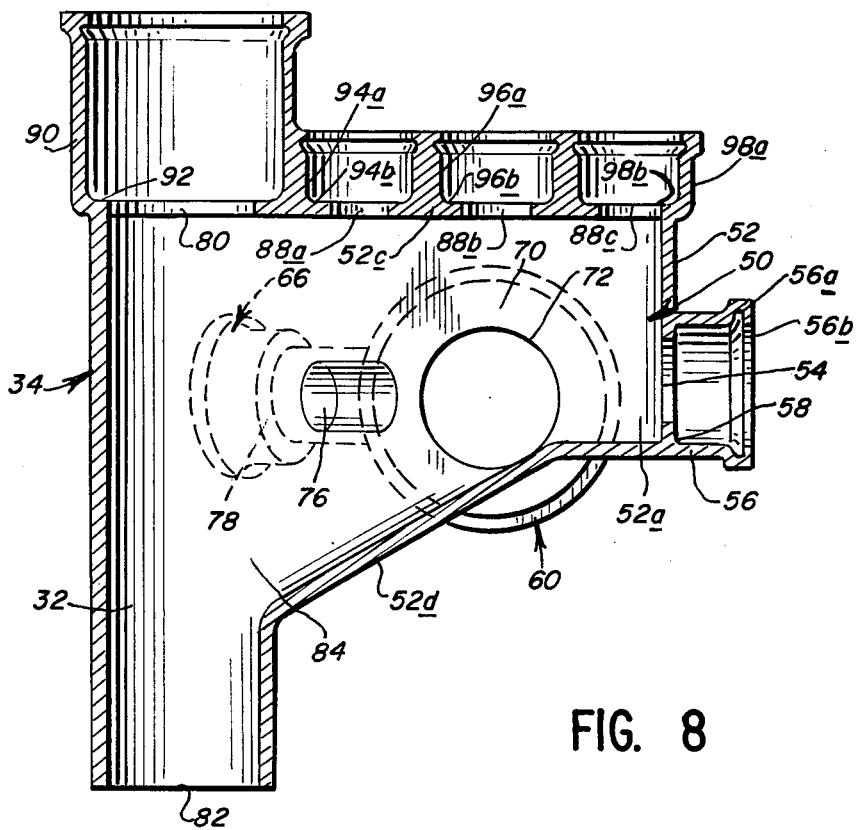
FIG. 8 is an enlarged sectional view of the fitting of FIGS. 6 and 7 taken substantially on section line 8—8 of FIG. 6.

With regard to the waste fitting 34, said fitting includes a vertically extending waste pipe segment 32 and a manifold section, generally 50, that is generally rectangular in cross-section and which projects laterally or radially from waste pipe segment 32. The vertical height of waste pipe segment 32 is greater than the overall height of the manifold section 50, and manifold section 50 is located wholly within the laterally projected confines of waste pipe, or stack, segment 32. As best seen in FIGS. 6–8, the manifold 50 has an end wall 52, a pair of spaced sidewalls 52a and 52b, a top wall 52c, and a bottom wall that includes a downwardly inclined segment 52d. The inclined segment 52d merges with the vertical waste stack 32 at a region upstream of the lower exit opening of of stack 32. The end wall 52 of manifold 50 that is maximally distal from pipe segment 32 is provided with a waste inlet 54 that is surrounded by a sleeve 56 whose inner periphery 57 is concentric with waste inlet 54 and spaced from the periphery of inlet 54 to provide an abutment annulus 58.

The fitting 34 is provided with additional waste inlets in the form of two mirror image sets of two inlets, each surrounded by a sleeve construction generally similar to the construction described in connection with waste inlet 54, sleeve 56, and abutment annulus 58. Thus, one set of sleeves 60 and 62 project at right angles from the opposite side walls 52a and 52b of the fitting's manifold 50, and thus project from the manifold in opposite directions. Another set of mirror image sleeves 64 and 66 project at an incline, of about 45°, from the side walls 52a and 52b of manifold 50 with a component of such projection opposite to the direction of projection of sleeve 56 from manifold 50.

The sleeve 60 surrounds an opening 68 in the side wall 52b of manifold 50 that is surrounded by an annular abutment 70. The sleeve 62 surrounds both a wall opening 72 in side wall 52a and an annular abutment 74. The sleeve 64 surrounds wall opening 76 and annular abutment 78, and sleeve 66 similarly surrounds a wall opening and annular abutment that is not shown in the drawings but is a mirror image of opening 72 and abutment 74.

The waste pipe, or stack, segment 32 is vertically elongated with an upper inlet aperture 80 and a lower outlet 82 respectively adjacent the upper and lower termini of said pipe segment 32, and with no obstruction in the projected vertical path between said inlet and outlet openings. The interior of manifold 50 empties into waste pipe segment 32 through a vertically elongated and unobstructed opening at the junction 84 of the waste pipe segment section 32 with manifold 50. The bottom wall section 52d of manifold 50 slopes downwardly in the direction toward pipe segment section 32.

An upper portion of fitting 34 is provided with a generally horizontal shelf or platform 52c. The inlet aperture 80 is located through shelf 52c. A plurality of three adjacent vent openings 88a, 88b, and 88c are provided through shelf 52c in a radial row extending laterally of waste pipe segment section 32. Each of the apertures 80, and 88a–c are surrounded respectively by sleeves that are spaced from the apertures to provide annular abutments surrounding the apertures. Sleeve 90 and annular abutment 92 surround aperture 80. Sleeve 94a and annular abutment 94b surround vent opening 88a; sleeve 96a and annular abutment 96b surround vent opening 88b; sleeve 98a and annular abutment 98b surround vent opening 88c.

The exterior of sleeves 90, 94a, 96a, and 98a are tangent and merge to provide a reinforced superstructure upon and above shelf 52c.

The annular abutment 92 provides a support for the lower end of a waste pipe segment 30a. The annular abutments 94b, 96b, and 98b provide supports for the lower ends of vent pipes 46. This arrangement provides for alternative constructions. The vent manifold 40 and vent pipes 46 could be pre-assembled away from the installation site. However, for field assemblage and connection and before the vent pipes are secured by threaded connection to the threaded sections 44a of the vent fitting 40, the vent pipes 46 are installed loosely upon the manifold 50 to be supported on the annular abutments surrounded by sleeves 94a, 96a and 98a. Said sleeves are of sufficient axial length to hold therein a lowermost segment of each vent pipe 46 that is of sufficient axial length to permit the vent manifold 40 to be first moved into position above the manifold-supported vent pipes 46, after which the vent pipes 46 are moved axially upwardly to a position for screw entry into threaded sections 44a, after which vent pipes 46 suspend from vent fitting 40 with their lower ends, or nipples, extending concentrically into sleeves 94a, 96a and 98a.

Each of the sleeve sections 56, 60, 62, 64, 66, 90, 94a, 96a, and 98a is formed with a similar outer end construction of a recess 56a and outermost inturned lip 56b which provides means to effect field caulking of the joint between the outer sleeve and the inner section of pipe, or pipe nipple, that projects concentrically into the sleeve. The preferred caulking is oakum and lead. The constructional features including the annular recess 56a that is partially overlain by lip 56b, permits field insertion and application of the necessary caulking material and sealing therewith after a pipe has been positioned in its sleeve. The sleeves are preferably made of greater thickness of material than the adjacent body sections, thus providing material for strengthening purposes at the place where needed, resulting in reduced cost and providing sleeve-receptors that are protected from injury during the caulking process.

While oakum and lead caulking joints are preferred, gasketed joints may also be used with the construction features disclosed.

The plan view in FIG. 3 illustrates schematically and/or typically how waste is, or could be, alternatively funneled into the waste manifold 50 of the waste fitting 34. Thus waste could be directed through pipe 61 and sleeve 60, and/or through pipe 63 and sleeve 62, and/or through pipe 65a, elbow 65b, and pipe 65c through sleeve 64, and/or through pipe 67a, elbow 67b, and pipe 67c through sleeve 66, with all leading to the interior of waste manifold 50.

From the foregoing it will be understood that a single form can be used for providing a universal waste fitting 34, and during the casting operation one can preselect which of the waste flow openings 54, 68, 72, 76, or the unseen opening surrounded by sleeve 66, will be left open.

If an installer, or plumber, knows in advance the pattern of connection of waste pipes to the waste fitting 34 that will be required for his installation, his order to the factory could specify this information, and during the casting operation only those waste flow openings that are to be operative will be provided in the waste fitting 34, with the other openings blanked off. The same is true for the vent openings 88a, 88b, and 88c. If code requires only one vent opening, then that opening can provided and others will be blanked off. The additional vent piping would then be omitted at installation. If any waste flow opening or vent opening has been blanked off, but is then found to be necessary in the field, the creation of the flow opening or vent opening can easily be effected in the field, using simple tools.

Furthermore, the caulked auxiliary openings to the waste fitting 34 allow use of many types of feed-in pipes, such as steel, cast iron, glass, copper or plastic. Also, the annular seats 94b, 96b, and 98b that surround the vent apertures that lead from the waste fitting to the vent fitting each operate to provide an abutment for a vent pipe section where needed.

While one preferred form of construction has been shown and described, it will be understood by one skilled in the act that variations may be made in the construction disclosed without departing from the scope of my inventions as set forth in the claims hereof:

We claim:

1. In a waste plumbing installation, for use upon each of respective dwelling stories in a multiple storied building that is equipped with both a vertical plumbing waste stack and a separate vertical plumbing vent stack, said waste stack and vent stack being laterally spaced, and each story of the building being provided with a unitary waste plumbing manifold into which multiple waste lines, from plumbing fixtures on the story, discharge for transfer and discharge into the waste stack;

the improvement comprising, in combination: said unitary waste plumbing manifold being shaped and arranged to provide a vertical waste pipe segment which serves as part of the waste stack and a laterally elongated waste manifold section projecting laterally of the waste pipe segment, said manifold section including a horizontal shelf with a plurality of laterally aligned, and laterally spaced, vent outlet openings therethrough, each vent outlet opening being surrounded by a horizontal seat, with each vent outlet opening and seat being surrounded by a sleeve that extends upwardly of said shelf, the uppermost extent of said sleeves being located in a common plane spaced below the upper end of the waste pipe segment portion of the waste plumbing manifold;

each story of the building also being provided with a laterally elongated, unitary, vent manifold that connects at one end thereof to the vent stack that is laterally spaced from the plumbing waste stack and which projects laterally from its connection to the vent stack to a location spaced vertically above said laterally elongated manifold section of the waste plumbing manifold;

said elongated vent manifold providing therein a plurality of laterally aligned, female threaded, downwardly facing, vent inlets, in numbers, and lateral spacing between pair of inlets, equal to the number and spacing of lateral vent outlet openings in the manifold section vertically therebelow, and said threaded, vent inlets being located in the same plane;

and a plurality of vertical vent pipe means, each of equal effective length extending between the plurality of the vent outlets and plurality of vent inlets, each vent pipe means being threaded at its upper end into one of the female threaded vent inlets of the vent manifold, to be supported from said vent manifold, and each vent pipe means being of an effective length to have its lower end telescope into one of said seat-surrounding sleeves of the waste manifold section that is located vertically below the vent manifold;

said seats in the waste manifold that surround the plurality of vent outlet openings therein being of a size adapted to be engaged by the lower ends of the multiple vent pipe means to provide initial support for said plurality of vent pipe means before each of said vent pipe means is screw-threadedly secured to and supported from the vent manifold thereabove, and with the lower end of each vent pipe means, that is supported by the vent manifold, being spaced above the seat therefor in the waste manifold, but being positioned with the corresponding surrounding sleeve.

* * * * *